United States Patent
Nakata

(10) Patent No.: US 9,420,508 B2
(45) Date of Patent: Aug. 16, 2016

(54) COMMUNICATION SYSTEM, BASE STATION AND COMMUNICATION CONTROL METHOD

(75) Inventor: Kazuhiro Nakata, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 134 days.

(21) Appl. No.: 14/240,729

(22) PCT Filed: Aug. 24, 2012

(86) PCT No.: PCT/JP2012/071499
§ 371 (c)(1),
(2), (4) Date: Jun. 13, 2014

(87) PCT Pub. No.: WO2013/027836
PCT Pub. Date: Feb. 28, 2013

(65) Prior Publication Data
US 2014/0323136 A1  Oct. 30, 2014

(30) Foreign Application Priority Data
Aug. 25, 2011 (JP) .................. 2011-183567

(51) Int. Cl.
*H04W 36/00* (2009.01)
*H04W 36/30* (2009.01)
*H04W 28/02* (2009.01)
(Continued)

(52) U.S. Cl.
CPC ...... *H04W 36/0094* (2013.01); *H04W 28/0236* (2013.01); *H04W 36/30* (2013.01); *H04W 88/08* (2013.01); *H04W 36/22* (2013.01); *H04W 48/20* (2013.01)

(58) Field of Classification Search
CPC ............ H04W 36/0094; H04W 88/08; H04W 28/0236
See application file for complete search history.

(56) References Cited

U.S. PATENT DOCUMENTS

| | | | | |
|---|---|---|---|---|
| 2005/0059408 | A1* | 3/2005 | Tiedemann | ........... H04W 16/00 455/452.1 |
| 2006/0135173 | A1* | 6/2006 | Vannithamby | ........ H04W 36/12 455/453 |

(Continued)

FOREIGN PATENT DOCUMENTS

| | | |
|---|---|---|
| EP | 2 309 794 A1 | 4/2011 |
| JP | 2007-74382 A | 3/2004 |

(Continued)

OTHER PUBLICATIONS

International Search Report; PCT/JP2012/071499; Aug. 24, 2012.

*Primary Examiner* — Mazda Sabouri
(74) *Attorney, Agent, or Firm* — Studebaker & Brackett PC

(57) ABSTRACT

A base station in a communication system including a mobile station and a plurality of base stations connected via a network calculates a traffic amount of data transmitted/received by the own base station; when a radio signal relating to a connection request to the own base station is received from the mobile station, calculates a reception quality value at the connection request; requests other base stations to transmit, to the own base station, a reception quality value of the radio signal received at the other base station and a traffic amount of the other base station; and selects a base station, which is to be a connection destination of the mobile station, based on the reception quality value and the traffic amount of the own base station and the reception quality value and the traffic amount received from each of the other base stations.

20 Claims, 3 Drawing Sheets

(51) Int. Cl.
*H04W 88/08* (2009.01)
*H04W 36/22* (2009.01)
*H04W 48/20* (2009.01)

(56) References Cited

U.S. PATENT DOCUMENTS

| | | | | |
|---|---|---|---|---|
| 2007/0253372 | A1* | 11/2007 | Nakayasu | H04W 36/30 370/331 |
| 2011/0053598 | A1* | 3/2011 | Ahluwalia | H04W 36/22 455/436 |
| 2011/0110270 | A1 | 5/2011 | Leng et al. | |
| 2011/0124332 | A1* | 5/2011 | Zhang | H04W 36/22 455/434 |
| 2011/0199919 | A1* | 8/2011 | Lin | H04B 7/155 370/252 |
| 2012/0202504 | A1* | 8/2012 | Wegmann | H04W 28/08 455/438 |

FOREIGN PATENT DOCUMENTS

| | | |
|---|---|---|
| JP | 2009-111772 A | 5/2009 |
| JP | 2009-159099 A | 7/2009 |

* cited by examiner

COMMUNICATION SYSTEM, BASE STATION AND COMMUNICATION CONTROL METHOD

TECHNICAL FIELD

The present invention relates to a communication system, a base station, and a communication control method.

BACKGROUND ART

In a communication system including base stations and a mobile station, the mobile station wirelessly connects to a base station to start communication. At this time, among the base stations existing around the mobile station, the mobile station sets a base station which transmits a radio signal having a highest reception quality, as a connection destination.

However, according to the above method, connection of the mobile stations may be concentrated on a certain base station, so that such base station may be congested. Therefore, there has been proposed a technique of receiving traffic information of each base station, which is transmitted by the base station, and selecting a connection destination so as to avoid the congestion of a base station (for example, refer to JP-A-2009-111772).

SUMMARY OF THE INVENTION

Problems to be Solved

In the above technique, it is necessary to allocate a radio resource for transmitting the traffic information to mobile stations existing therearound, so that the radio resource can not be effectively used. Therefore, it is desired to use the radio resource more effectively in the communication system.

Accordingly, the present invention has been made in view of the above circumstances, and an object of the present invention is to provide a technique capable of more effectively using a radio resource in a communication system.

Means for Solving the Problem

A communication system according to an aspect of the present invention includes a plurality of base stations which are connected via a network, and a mobile station, and a base station includes: a first communication unit configured to perform wireless communication; a second communication unit configured to perform communication via the network; and a control unit. The control unit is configured to: calculate a traffic amount of data which is transmitted and received by the own base station; when a radio signal relating to a connection request to the own base station is received from the mobile station, calculate a reception quality value at the connection request; request each of other base stations to transmit, to the own base station, a reception quality value of the radio signal received at the other base station and a traffic amount of the other base station, through the second communication unit; and select a base station, which is to be a connection destination of the mobile station, based on the reception quality value and the traffic amount of the own base station and the reception quality value and the traffic amount received from each of the other base stations.

The control unit may be configured to: calculate an uplink traffic amount as the traffic amount of the own base station; for each of the own base station and the other base stations, calculate an uplink traffic amount at allocation when allocating a radio resource to the mobile station, based on the reception quality value of the corresponding base station, and calculate an available uplink traffic amount based on the uplink traffic amount at allocation, a maximum transmission traffic amount which can transmit data to the network, and the uplink traffic amount; and select, as the connection destination of the mobile station, a base station having a maximum available uplink traffic amount among the available uplink traffic amount of the own base station and the available uplink traffic amount of each of the other base stations.

The control unit may be configured to: calculate a downlink traffic amount as the traffic amount of the own base station; for each of the own base station and the other base stations, calculate a downlink traffic amount at allocation when allocating a radio resource to the mobile station, based on the reception quality value of the corresponding base station; and select, as the connection destination of the mobile station, a base station in which a sum of the downlink traffic amount at allocation and the downlink traffic amount is smaller than a maximum reception traffic amount which can receive data from the network, and which has the maximum available uplink traffic amount among the available uplink traffic amount of the own base station and the available uplink traffic amount of each of the other base stations.

The control unit may be configured to: when the radio signal relating to the connection request to the own base station is received, request each of the other base stations to transmit the reception quality value calculated at the other base station, to the own base station; and request only a base station which has made a response of the reception quality value among the other base stations, to transmit the traffic information to the own base station.

The communication system may further include a line concentrator, and the second communication unit of each base station may perform communication with the other base stations through the line concentrator.

Each base station may further include a storage unit, and when a radio signal relating to a connection request to another base station is received from the mobile station, the control unit may be configured to calculate a reception quality value of the connection request and store the reception quality value in the storage unit in association with an identification signal of the mobile station.

A base station according to another aspect of the present invention is used in a communication system including a mobile station and a plurality of base stations which are connected via a network. The base station includes: a first communication unit configured to perform wireless communication; a second communication unit configured to perform communication via the network; and a control unit. The control unit is configured to: calculate a traffic amount of data which is transmitted and received by the own base station; when a radio signal relating to a connection request to the own base station is received from the mobile station, calculate a reception quality value at the connection request; request each of other base stations to transmit, to the own base station, a reception quality value of the radio signal received at the other base station and a traffic amount of the other base station, through the second communication unit; and select a base station, which is to be a connection destination of the mobile station, based on the reception quality value and the traffic amount of the own base station and the reception quality value and the traffic amount received from each of the other base stations.

A communication control method according to another aspect of the present invention is used in a communication system including a mobile station, and a plurality of base stations which are connected via a network. In the method, a base station performs: calculating a traffic amount of data which is transmitted and received by the own base station; when a radio signal relating to a connection request to the own base station is received from the mobile station, calculating a reception quality value at the connection request; requesting each of other base stations to transmit, to the own base station, a reception quality value of the radio signal received at the other base station and a traffic amount of the other base station; and selecting a base station, which is to be a connection destination of the mobile station, based on the reception quality value and the traffic amount of the own base station and the reception quality value and the traffic amount received from each of the other base stations.

A communication system according to another aspect of the present invention includes a plurality of base stations which are connected via a network, a mobile station, and a relay station configured to relay data between the base stations and the mobile station, and a base station includes: a first communication unit configured to perform wireless communication; a second communication unit configured to perform communication via the network, and a control unit. The control unit is configured to: calculate a traffic amount of data which is transmitted and received by the own base station, when a radio signal relating to a connection request to the own base station is received from the relay station, calculate a reception quality value at the connection request, request each of other base stations to transmit, to the own base station, a reception quality value of the radio signal received at the other base station and a traffic amount of the other base station, through the second communication unit; and select a base station, which is to be a connection destination of the relay station, based on the reception quality value and the traffic amount of the own base station and the reception quality value and the traffic amount received from each of the other base stations.

Effects of Invention

According to the above configuration, a radio resource can be effectively used in the communication system.

EMBODIMENTS OF THE INVENTION

Hereinafter, an embodiment of the present invention will be described with reference to the drawings.

Figure 1:
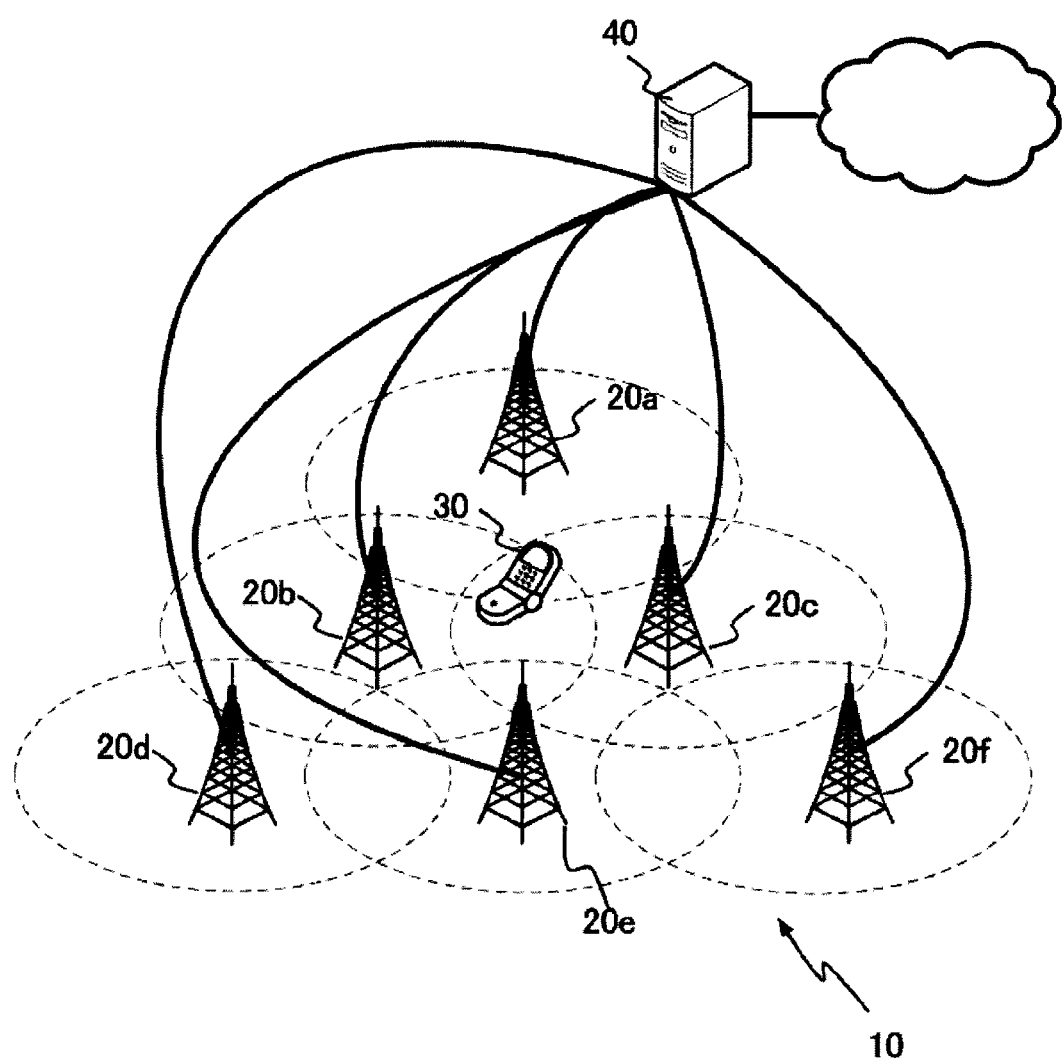
FIG. 1 shows a configuration of a communication system according to an embodiment of the present invention.

FIG. 1 shows a configuration of a communication system according to an embodiment of the present invention. A communication system 10 includes a plurality of base stations 20 (a base station 20a to a base station 20f), a mobile station 30 and a line concentrator 40.

The base station 20 is wirelessly connected to the mobile station 30 and is line-connected to the line concentrator 40. The base station 20 receives data from an upper network, which is relayed by the line concentrator 40, and transmits the data to the mobile station 30. Also, the base station 20 receives data from the mobile station 30 and transmits the data to the upper network through the line concentrator 40. Further, the base station 20 can transmit and receive data to and from the other base stations 20 which are connected to the line concentrator 40, through the line concentrator 40.

Figure 2:
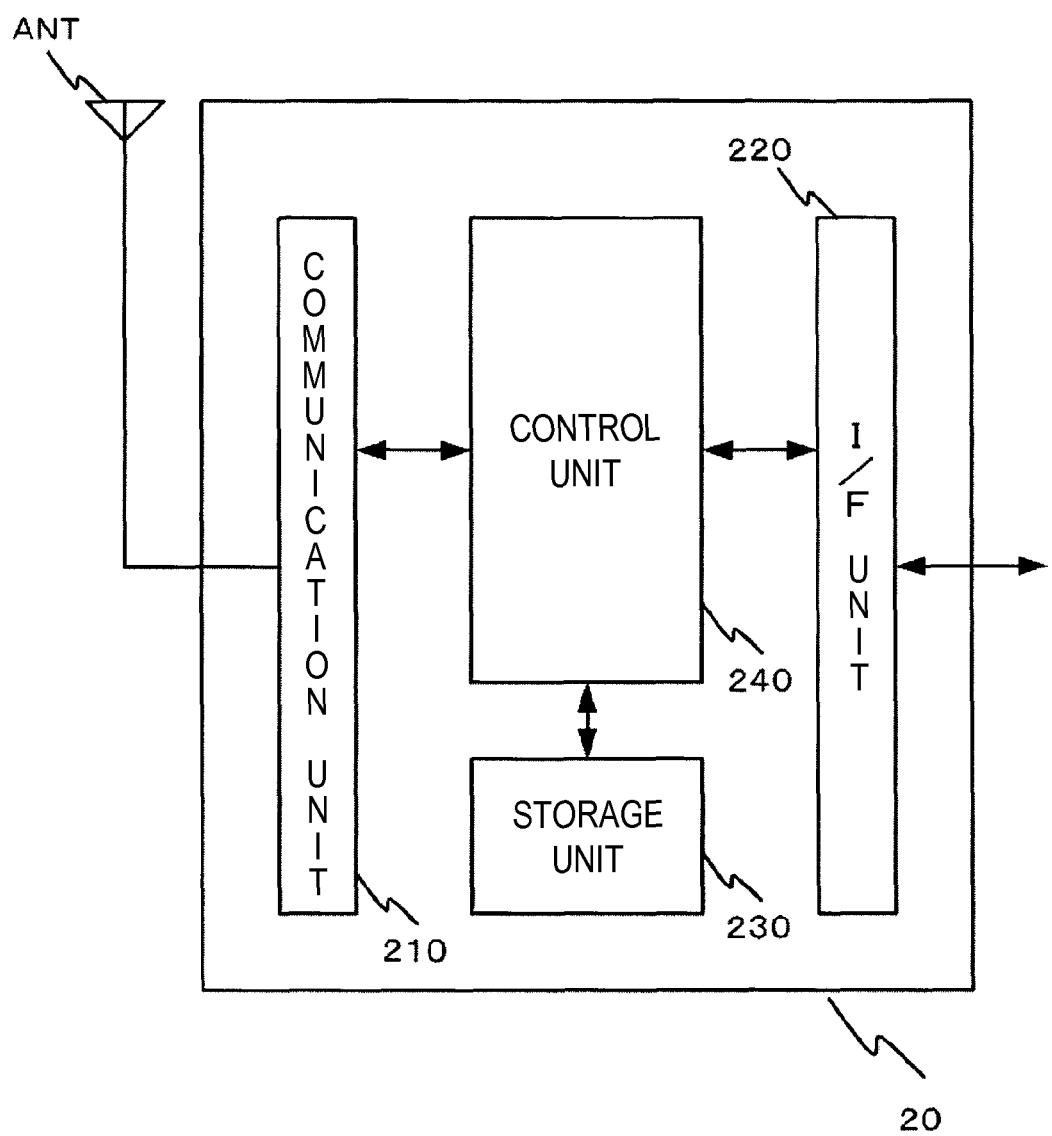
FIG. 2 is a functional block diagram showing a configuration of a base station according to the embodiment of the present invention.

FIG. 2 shows a configuration of the base station according to the embodiment of the present invention. The base station 20 includes a communication unit 210, an interface (I/F) unit 220, a storage unit 230, a control unit 240 and an antenna ANT.

The communication unit 210 receives an uplink radio signal, which is transmitted from the mobile station 30, through the antenna ANT, converts the radio signal into a baseband signal (down conversion) and then performs demodulation and decoding processing for the baseband signal to thereby obtain data. The communication unit 210 outputs the obtained data to the control unit 240.

Also, the communication unit 210 obtains a baseband signal by performing encoding and modulation processing for the data from the control unit 240 and then converts the baseband signal into a downlink radio signal (up conversion). The communication unit 210 transmits the download radio signal to the mobile station 30 through the antenna ANT.

The I/F unit 220 receives the data to be transmitted to the mobile station 30 from the upper network, which is relayed by the line concentrator 40. Also, the I/F unit 220 transmits the data, which is received from the mobile station 30, to the upper network.

The storage unit 230 includes, for example, a memory, and stores therein a variety of information which is used for control in the base station 20, for example. Also, the storage unit 230 stores therein traffic information about a traffic amount of data which is being currently processed by the own base station, a maximum transmission traffic amount which can transmit data to the line concentrator 40, and a maximum reception traffic amount which can receive data from the line concentrator 40.

The control unit 240 includes, for example, a CPU, and controls various functions of the base station 20. Also, the control unit 240 controls radio resource allocation to the mobile station 30, a transmission output, a modulation method and an encoding rate when transmitting and receiving data to and from the mobile station 30.

Also, the control unit 240 selects whether to connect the mobile station 30, which makes a connection request to the own base station, to the own base station or another base station 20. When connecting the mobile station 30, which makes the connection request, to the own base station, the control unit 240 transmits a response to the connection request. On the other hand, when connecting the mobile station 30, which makes the connection request, to another base station, the control unit 240 rejects the connection to the own base station and notifies the mobile station to connect to the selected base station 20.

When selecting a connection destination of the mobile station 30 having made the connection request, the control unit 240 uses a traffic amount of the data which is being processed by each base station 20 and a reception quality value calculated by each base station from the radio signal which is transmitted from the mobile station 30 at the connection request. Therefore, the control unit 240 calculates an uplink data amount of data transmitted from the mobile station 30 to the line concentrator 40 (the uplink) and a downlink traffic amount of data transmitted from the line concentrator 40 to the mobile station 30 (the downlink), which are periodically processed by the own base station. Then, the control unit 240 stores the calculation results in the storage unit 230, as the traffic information.

It is noted that the mobile station 30 transmits the radio signal to around the mobile station 30 so as to make a connection request to a certain base station 20. Therefore, not only the own base station but the other base stations 20 can also receive the radio signal. The control unit 240 uses the information relating to the radio signal, which is received by the other stations, so as to select the connection destination of the mobile station 30 having made the connection request.

Specifically, when selecting the connection destination of the mobile station 30 having made the connection request, the control unit 240 makes a request to the other base stations 20 for the reception quality values of the radio signal transmitted by the mobile station 30 at the connection request and the traffic information of the other base stations 20 through the line concentrator 40, and the control unit 240 acquires the reception quality values and traffic information of the other base stations 20. Then, the control unit 240 selects the connection destination of the mobile station 30 having made the connection request by using the reception quality value and traffic information of the own base station and the reception quality values and traffic information of the other base stations 20.

When selecting the connection destination of the mobile station 30 having made the connection request, the control unit 240 first uses the reception quality values of the own base station and other base stations 20. From the received reception quality values, the control unit 240 calculates an uplink traffic amount at allocation, which occurs from a modulation method having the maximum data transmission amount among available modulation methods which can be set when transmitting (uplink) a radio signal from the mobile station 30 having made the connection request to the own base station. Then, the control unit 240 sums the calculated uplink traffic amount at allocation and the uplink traffic amount stored in the storage unit 230 and further calculates an available uplink traffic amount which is a difference between the maximum transmission traffic amount stored in the storage unit 230 and the calculated sum.

The control unit 240 assumes that the reception quality value when transmitting (downlink) a radio signal from the own base station to the mobile station 30 having made the connection request is equivalent to the reception quality value at the uplink. Based on this assumption, the control unit 240 calculates a downlink traffic amount at allocation, which occurs from a modulation method having the maximum data transmission amount among available modulation methods which can be set at the downlink. Then, the control unit 240 sums the calculated download traffic amount at allocation and the downlink traffic amount stored in the storage unit 230, and further calculates an available downlink traffic amount which is a difference between the maximum reception traffic amount stored in the storage unit 230 and the calculated sum.

Further, the control unit 240 calculates the available uplink traffic amounts and the available downlink traffic amounts of the other base stations 20 by using the reception quality values and traffic information received from the respective other base stations 20. At the calculation, the maximum transmission traffic amounts and maximum reception traffic amounts of the other base stations 20 may be beforehand stored in the storage unit 230 of the own base station or may be received from the other base stations 20 together with the traffic information.

The control unit 240 extracts the own base station or other base stations 20 in which the calculated available uplink traffic amount and available downlink traffic amount exceed 0 (there are margins for the maximum transmission traffic amount and the maximum reception traffic amount). Then, the control unit 240, from the extracted own base station and other base stations 20, selects the base station which has the maximum uplink traffic amount at allocation, as the connection destination of the mobile station 30.

Incidentally, when the control unit 240 receives the request for the reception quality value of the radio signal transmitted by the mobile station 30 at the connection request and the traffic information, from the other base stations 20 through the line concentrator 40, the control unit 240 transmits the reception quality value and the traffic information to the other base stations 20 through the line concentrator 40. In the meantime, when the control unit 240 receives the radio signal at the connection request transmitted to the other base stations 20, the control unit calculates the reception quality value of the radio signal, stores the reception quality value in the storage unit 230 in association with an identification signal of the mobile station 30 having made the connection request, and transmits the reception quality value of the mobile station 30 coinciding with the identification signal of the mobile station 30 included in the request.

Figure 3:
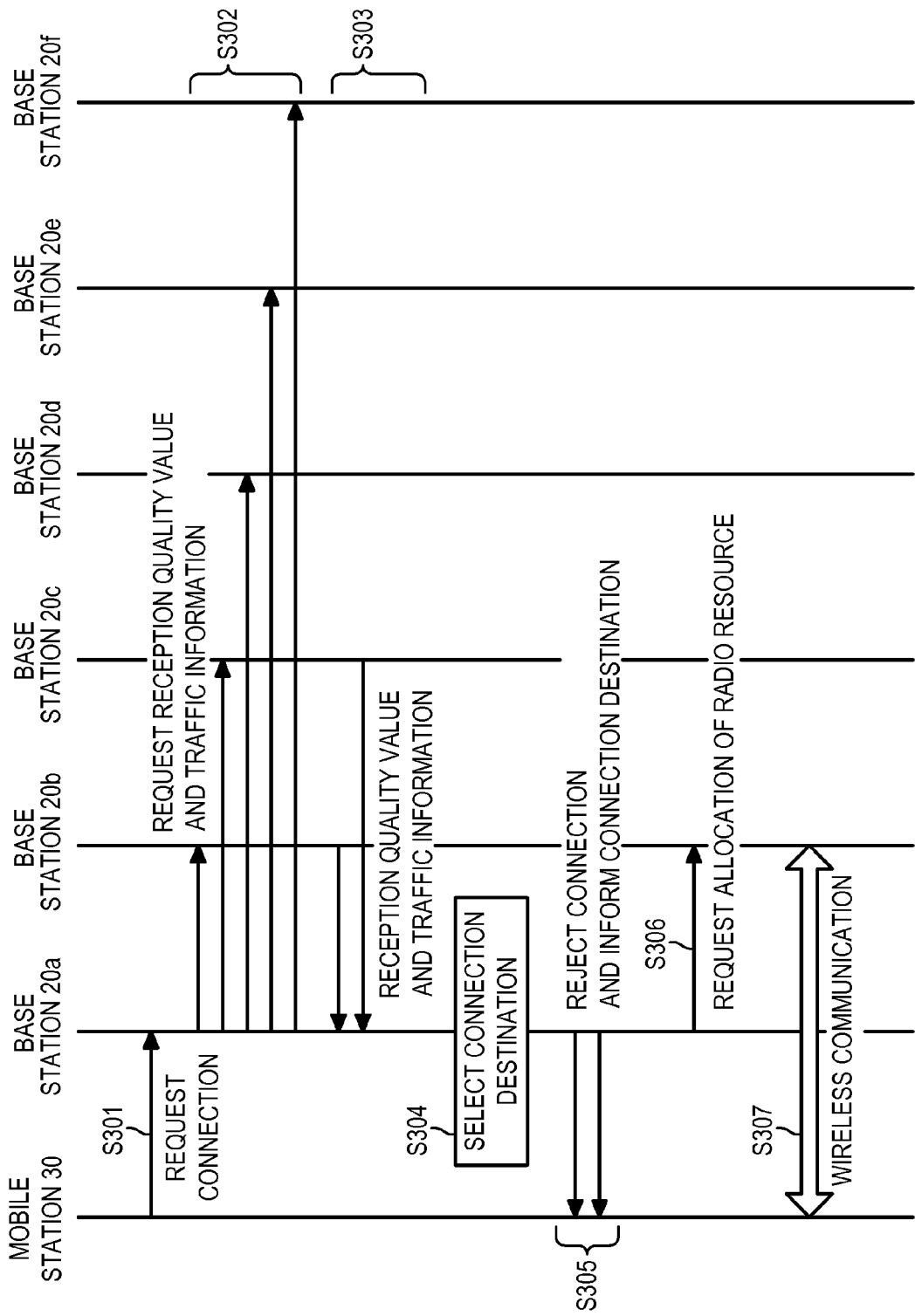
FIG. 3 shows processing of the communication system according to the embodiment of the present invention.

In the below, the processing of selecting the connection destination of the mobile station 30 having made the connection request, which is executed in the base station 20 (the base station 20a), is described with reference to FIG. 3. FIG. 3 shows operations of the base stations 20 (the base station 20a to the base station 20f) configuring the communication system 10 and the operations of the mobile station 30 having made the connection request.

As shown in FIG. 3, in step S301, the mobile station 30 makes a connection request to the base station 20a, and the base station 20a receives the connection request.

In step S302, the base station 20a makes a request to the other base stations 20 (the base station 20b to the base station 20f) existing therearound for the reception quality values of the radio signal transmitted by the mobile station 30 at the connection request, and the traffic information through the line concentrator 40, and the other base stations 20 (the base station 20b to the base station 20f) receive the request.

In step S303, when the reception quality value of the mobile station 30 coinciding with the identification signal of the mobile station 30 included in the request is stored in the storage units 230, the other base stations 20 (the base stations 20b to 20f) transmit the reception quality values and the traffic information to the base station 20a through the line concentrator 40, as a response to the request. Then, the base station 20a receives the reception quality values and the traffic information. For example, here, the base station 20b and the base station 20c transmit the reception quality values and the traffic information to the base station 20a, as a response to the request. On the other hand, since the reception quality value of the mobile station 30 coinciding with the identification signal of the mobile station 30 included in the request is not stored in the storage units 230 of the base stations 20d to 20f, the base station 20d to the base station 20f do not transmit the reception quality values and the traffic information to the base station 20a, as a response to the request.

In step S304, the base station 20a selects a connection destination of the mobile station 30 by using the reception quality values and the traffic information of the own base station, the base station 20b and the base station 20c. Here, the base station 20a selects the base station 20b, as the connection destination of the mobile station 30.

In step S305, the base station 20a rejects the connection of the mobile station 30 to the own base station and notifies the mobile station 30 to connect to the selected base station 20b, and the mobile station 30 receives the notification.

In step S306, the base station 20a requests the base station 20b to allocate a radio resource for the mobile station 30 and the base station 20b receives the request.

In step S307, the mobile station 30 makes a connection request to the base station 20b, the base station 20b makes a notification to permit the connection request, and the mobile station 30 and the base station 20b start communication.

As described above, according to the embodiment, when the control unit 240 of the base station 20 receives the connection request from the mobile station 30, the control unit determines the connection destination of the mobile station 30 by using the traffic information of the own base station and the other base stations 20. Thereby, since it is possible to determine the connection destination of the mobile station 30 without allocating the radio resource, it is possible to allocate the radio resource to the transmission/reception of the data to and from the mobile station 30, thereby effectively using the radio resource.

Although the present invention has been specifically described with reference to the drawings and the embodiment, it is apparent to one skilled in the art that a variety of changes and modifications can be made based on the above disclosures. Therefore, it should be noted that the changes and modifications are included in the scope of the invention.

For example, the functions and the like included in the respective members, the respective means, the respective steps and the like can be rearranged so as not to be logically contradicted and the plurality of means or steps can be combined into one or divided.

In the above embodiment, the base station 20 transmits and receives the data to and from the other base stations 20 through the line concentrator 40. However, when the network of the communication system 10 is configured such that the base station can directly transmit and receive the data to and from the other base stations, the IF unit 220 directly transmits and receives the data to and from the other base stations.

Also, in the above embodiments, the base station 20 requests the other base stations 20 to transmit, to the base station 20a, the reception quality values and the traffic information of the mobile station 30 having made the connection request at the same time. However, instead of this configuration, the base station 20 may first make a request to the other base stations 20 only for the reception quality values of the mobile station 30 having made the connection request, request only the base station 20, which can receive the radio signal of the mobile station 30 at the connection request and calculate the reception quality value, to transmit the corresponding reception quality value, as a response, and then further request only the other base station 20 having made the response to transmit the traffic information.

Furthermore, in the above embodiment, the base station 20 selects the base station when the connection request is received from the mobile station 30. However, the same processing may be also performed when a relay station, which relays the data between the base station 20 and the mobile station 30, makes a connection request.

The application is based on a Japanese Patent Application No. 2011-183567 filed on Aug. 25, 2011, the contents thereof being incorporated herein by reference.

EXPLANATION OF REFERENCE NUMERALS

10: communication system
20: base station
30: mobile station
40: line concentrator
210: communication unit
220: I/F unit
230: storage unit
240: control unit
ANT: antenna

The invention claimed is:

1. A communication system comprising a plurality of base stations which are connected via a network, and a mobile station, each base station comprising:
    a first communication unit configured to perform wireless communication;
    a second communication unit configured to perform communication via the network; and
    a control unit,
    wherein the control unit is configured to:
    calculate a traffic amount of data which is transmitted and received by the own base station;
    when a radio signal relating to a connection request to the own base station is received from the mobile station, calculate a reception quality value of the radio signal relating to the connection request;
    for at least one of other base stations, request to transmit to the own base station, a reception quality value of the radio signal relating to the connection request received at the own base station, which was calculated at the other base station, and a traffic amount of the other base station, through the second communication unit; and
    select a base station, which is to be a connection destination of the mobile station, based on the reception quality value and the traffic amount of the own base station and the reception quality value and the traffic amount received from each of the at least one of other base stations.

2. The communication system according to claim 1, wherein the control unit is configured to:
    calculate an uplink traffic amount as the traffic amount of the own base station;
    for each of the own base station and the at least one of other base stations,
    calculate an uplink traffic amount at allocation when allocating a radio resource to the mobile station, based on the reception quality value of the corresponding base station, and
    calculate an available uplink traffic amount based on the uplink traffic amount at allocation, a maximum transmission traffic amount which can transmit data to the network, and the uplink traffic amount; and
    select, as the connection destination of the mobile station, a base station having a maximum available uplink traffic amount among the available uplink traffic amount of the own base station and the available uplink traffic amount of each of the at least one of other base stations.

3. The communication system according to claim 2, wherein the control unit is configured to:
    calculate a downlink traffic amount as the traffic amount of the own base station;
    for each of the own base station and the at least one of other base stations, calculate a downlink traffic amount at allocation when allocating a radio resource to the mobile station, based on the reception quality value of the corresponding base station; and
    select, as the connection destination of the mobile station, a base station in which a sum of the downlink traffic amount at allocation and the downlink traffic amount is smaller than a maximum reception traffic amount which can receive data from the network, and which has the maximum available uplink traffic amount among the available uplink traffic amount of the own base station and the available uplink traffic amount of each of the at least one of other base stations.

4. The communication system according to claim 1, wherein the control unit is configured to:
when the radio signal relating to the connection request to the own base station is received, request each of other base stations, other than the at least one of other base stations requested to transmit a reception quality value and a traffic amount to the own base station, to transmit to the own base station, a reception quality value of the radio signal relating to the connection request received at the own base station, which was calculated at the other base station; and
request only a base station which has made a response of the reception quality value among the other base stations, other than the at least one of other base stations requested to transmit a reception quality value and a traffic amount to the own base station, to transmit a traffic amount of the other base station to the own base station.

5. The communication system according to claim 1, further comprising:
a line concentrator,
wherein the second communication unit of each base station performs communication with the other base stations through the line concentrator.

6. The communication system according to claim 1, wherein each base station further comprises a storage unit, and
wherein when a radio signal relating to a connection request to another base station is received from the mobile station, the control unit is configured to calculate a reception quality value of the connection request and store the reception quality value in the storage unit in association with an identification signal of the mobile station.

7. A base station of a communication system comprising a mobile station and a plurality of base stations which are connected via a network, the base station comprising:
a first communication unit configured to perform wireless communication;
a second communication unit configured to perform communication via the network; and
a control unit,
wherein the control unit is configured to:
calculate a traffic amount of data which is transmitted and received by the own base station;
when a radio signal relating to a connection request to the own base station is received from the mobile station, calculate a reception quality value of the radio signal relating to the connection request;
for at least one of other base stations, request to transmit to the own base station, a reception quality value of the radio signal relating to the connection request received at the own base station, which was calculated at the other base station, and a traffic amount of the other base station, through the second communication unit; and
select a base station, which is to be a connection destination of the mobile station, based on the reception quality value and the traffic amount of the own base station and the reception quality value and the traffic amount received from each of the at least one of other base stations.

8. The base station according to claim 7, wherein the control unit is configured to:
calculate an uplink traffic amount as the traffic amount of the own base station;
for each of the own base station and the at least one of other base stations,
calculate an uplink traffic amount at allocation when allocating a radio resource to the mobile station, based on the reception quality value of the corresponding base station, and
calculate an available uplink traffic amount based on the uplink traffic amount at allocation, a maximum transmission traffic amount which can transmit data to the network, and the uplink traffic amount; and
select, as the connection destination of the mobile station, a base station having a maximum available uplink traffic amount among the available uplink traffic amount of the own base station and the available uplink traffic amount of each of the at least one of other base stations.

9. The base station according to claim 8, wherein the control unit is configured to:
calculate a downlink traffic amount, as the traffic amount of the own base station;
for each of the own base station and the at least one of other base stations, calculate a downlink traffic amount at allocation when allocating a radio resource to the mobile station, based on the reception quality value of the corresponding base station, and
select, as the connection destination of the mobile station, a base station in which a sum of the downlink traffic amount at allocation and the downlink traffic amount is smaller than a maximum reception traffic amount which can receive data from the network, and which has the maximum available uplink traffic amount among the available uplink traffic amount of the own base station and the available uplink traffic amount of each of the at least one of other base stations.

10. The base station according to claim 7, wherein the control unit is configured to:
when the radio signal relating to the connection request to the own base station is received, request each of other base stations, other than the at least one of other base stations requested to transmit a reception quality value and a traffic amount to the own base station, to transmit to the own base station, a reception quality value of the radio signal relating to the connection request received at the own base station, which was calculated at the other base station; and
request only a base station which has made a response of the reception quality value among the other base stations, other than the at least one of other base stations requested to transmit a reception quality value and a traffic amount to the own base station, to transmit a traffic amount of the other base station to the own base station.

11. The base station according to claim 7, wherein the communication system further comprises a line concentrator, and
wherein the second communication unit performs communication with the other base stations through the line concentrator.

12. The base station according to claim 7, further comprising:
a storage unit,
wherein when a radio signal relating to a connection request to another base station is received from the mobile station, the control unit is configured to calculate a reception quality value of the connection request and store the reception quality value in the storage unit in association with an identification signal of the mobile station.

13. A communication control method of a communication system comprising a mobile station, and a plurality of base stations which are connected via a network, wherein each base station performs:
- calculating a traffic amount of data which is transmitted and received by the own base station;
- when a radio signal relating to a connection request to the own base station is received from the mobile station, calculating a reception quality value of the radio signal relating to the connection request;
- for at least one of other base stations, requesting to transmit to the own base station, a reception quality value of the radio signal relating to the connection request received at the own base station, which was calculated at the other base station, and a traffic amount of the other base station; and
- selecting a base station, which is to be a connection destination of the mobile station, based on the reception quality value and the traffic amount of the own base station and the reception quality value and the traffic amount received from each of the at least one of other base stations.

14. The communication control method according to claim 13,
wherein each base station performs:
- calculating an uplink traffic amount as the traffic amount of the own base station;
- for each of the own base station and the at least one of other base stations,
- calculating an uplink traffic amount at allocation when allocating a radio resource to the mobile station, based on the reception quality value of the corresponding base station, and
- calculating an available uplink traffic amount based on the uplink traffic amount at allocation, a maximum transmission traffic amount which can transmit data to the network, and the uplink traffic amount; and
- selecting, as the connection destination of the mobile station, a base station having a maximum available uplink traffic amount among the available uplink traffic amount of the own base station and the available uplink traffic amount of each of the at least one of other base stations.

15. The communication control method according to claim 14,
wherein each base station performs:
- calculating a downlink traffic amount as the traffic amount of the own base station;
- for each of the own base station and the at least one of other base stations, calculating a downlink traffic amount at allocation when allocating a radio resource to the mobile station, based on the reception quality value of the corresponding base station; and
- selecting, as the connection destination of the mobile station, a base station in which a sum of the downlink traffic amount at allocation and the downlink traffic amount is smaller than a maximum reception traffic amount which can receive data from the network, and which has the maximum available uplink traffic amount among the available uplink traffic amount of the own base station and the available uplink traffic amount of each of the at least one of other base stations.

16. The communication control method according to claim 13,
wherein each base station performs:
when the radio signal relating to the connection request to the own base station is received, requesting each of other base stations, other than the at least one of other base stations requested to transmit a reception quality value and a traffic amount to the own base station, to transmit to the own base station, a reception quality value of the radio signal relating to the connection request received at the own base station, which was calculated at the other base station, and
requesting only a base station which has made a response of the reception quality value among the other base stations, other than the at least one of other base stations requested to transmit a reception quality value and a traffic amount to the own base station, to transmit a traffic amount of the other base station to the own base station.

17. The communication control method according to claim 13,
wherein the communication system further comprises a line concentrator, and
wherein each base station performs communication with the other base stations through the line concentrator.

18. The communication control method according to claim 13,
wherein each base station performs:
when a radio signal relating to a connection request to the other base station is received from the mobile station, calculating a reception quality value of the connection request and storing the reception quality value in association with an identification signal of the mobile station.

19. A communication system comprising a plurality of base stations which are connected via a network, a mobile station, and a relay station configured to relay data between the base stations and the mobile station, each base station comprising:
- a first communication unit configured to perform wireless communication;
- a second communication unit configured to perform communication via the network, and
- a control unit,
wherein the control unit is configured to:
- calculate a traffic amount of data which is transmitted and received by the own base station;
- when a radio signal relating to a connection request to the own base station is received from the relay station, calculate a reception quality value of the radio signal relating to the connection request;
- for at least one of other base stations, request to transmit to the own base station, a reception quality value of the radio signal relating to the connection request received at the own base station, which was calculated at the other base station, and a traffic amount of the other base station, through the second communication unit; and
- select a base station, which is to be a connection destination of the relay station, based on the reception quality value and the traffic amount of the own base station and the reception quality value and the traffic amount received from each of the at least one of other base stations.

20. The communication system according to claim 19,
wherein the control unit is configured to:
when the radio signal relating to the connection request to the own base station is received, request each of other base stations, other than the at least one of other base stations requested to transmit a reception quality value and a traffic amount to the own base station, to transmit to the own base station, a reception quality value of the radio signal relating to the connection request received at the own base station, which was calculated at the other base station; and request only a base station which has made a response of the reception quality value among the other base stations, other than the at least one of other base stations requested to transmit a reception quality value and a traffic amount to the own base station, to transmit a traffic amount of the other base station to the own base station.

* * * * *